(12) United States Patent
Futami

(10) Patent No.: US 7,695,175 B2
(45) Date of Patent: Apr. 13, 2010

(54) VEHICLE LAMP

(75) Inventor: Takashi Futami, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 15 days.

(21) Appl. No.: 12/048,866

(22) Filed: Mar. 14, 2008

(65) Prior Publication Data

US 2008/0232127 A1 Sep. 25, 2008

(30) Foreign Application Priority Data

Mar. 14, 2007 (JP) ............... 2007-065833

(51) Int. Cl.
*F21V 9/00* (2006.01)
(52) U.S. Cl. ...................... 362/511; 362/545
(58) Field of Classification Search ................. 362/551, 362/555, 581, 494, 498, 499, 511, 540–545, 362/800
See application file for complete search history.

(56) References Cited

U.S. PATENT DOCUMENTS

| | | | |
|---|---|---|---|
| 4,257,084 A * | 3/1981 | Reynolds | 362/601 |
| 4,389,698 A * | 6/1983 | Cibie | 362/511 |
| 5,434,754 A * | 7/1995 | Li et al. | 362/511 |
| 5,590,945 A * | 1/1997 | Simms | 362/623 |
| 6,102,559 A * | 8/2000 | Nold et al. | 362/558 |
| 6,244,734 B1 * | 6/2001 | Hulse | 362/495 |
| 6,305,813 B1 | 10/2001 | Lekson et al. | |
| 6,547,428 B1 * | 4/2003 | Delattre | 362/511 |
| 6,652,129 B2 | 11/2003 | Aoki | |
| 2005/0088758 A1 | 4/2005 | Minano et al. | |
| 2006/0146555 A1 | 7/2006 | Inaba | |

FOREIGN PATENT DOCUMENTS

| | | |
|---|---|---|
| EP | 1677045 | 7/2006 |
| JP | 2002324418 | 11/2002 |
| JP | 2006164908 | 6/2006 |

OTHER PUBLICATIONS

Search Report for European Patent App. No. 08004828.3 (Jun. 18, 2008).

* cited by examiner

*Primary Examiner*—Jacob Y Choi
(74) *Attorney, Agent, or Firm*—Cermak Kenealy Vaidya & Nakajima LLP

(57) ABSTRACT

A vehicle lamp can suppress dimensions in the depth direction and provide a large emission area with a simple configuration, and has a light-emitting surface of wraparound configuration with impressive appearance and aesthetic qualities. The vehicle lamp can include a light source unit and a light guide lens. The light source unit can include a light source, and a converting part for converting light from the light source to a narrow width light. The conversion part has an emission area for emitting the converted light. The light guide lens can include one end face having a shape corresponding to the emission area of the conversion part, a thin plate-like light guiding portion for guiding the incident light, and another end face being a farthest part away from the incident surface. The light guide lens guides the incident light toward the other end face and emits the guided light from a predetermined surface thereof as it travels on its way through the lens.

16 Claims, 7 Drawing Sheets

VEHICLE LAMP

This application claims the priority benefit under 35 U.S.C. §119 of Japanese Patent Application No. 2007-065833 filed on Mar. 14, 2007, which is hereby incorporated in its entirety by reference.

BACKGROUND

1. Technical Field

The presently disclosed subject matter relates to a vehicle lamp to be used as various types of lamps intended for a vehicle, such as a vehicle position lamp.

2. Description of the Related Art

In recent years, automobile and vehicle design has shifted to forms in which the four corners of the vehicle body are cut away obliquely and to a larger extent as compared to previous designs.

Vehicle lamps that are to be mounted near the four corners of the vehicle body are therefore shaped to wrap around these body portions, and even the fender area of the vehicle body. Accordingly, even if light guide lenses are provided on the light sources, this new structure and design has made it difficult for the outermost ends (outside ends) of the light guide lenses of the vehicle lamps to emit light.

In addition, in order to differentiate the vehicle lamps from conventional lamps in appearance, demand has been increasing for vehicle-lamp designs using a so-called solid-looking lens and crystalline-looking lens.

Vehicle lamps that can satisfy such demand, however, can be difficult to configure.

Vehicle lamps using a light guide lens are disclosed, for example, in Japanese Patent Application Laid-Open Nos. 2002-324418 (corresponding to U.S. Pat. No. 6,652,129 B2) and 2006-164908 (corresponding to U.S. Patent Publication No. 2006/0146555A1).

In view of installation space, both the vehicle lamps disclosed in the conventional art references set forth above are configured so that light emitted forward from a light source is directed by the light guide lens to the back of the light source so that the light guide lens emits light.

Nevertheless, in vehicle lamps having such configurations, the amount of light incident on the light guide lens is small, and therefore the light guide lens looks dim when the light guide lens is observed from outside of the vehicle.

In addition to this, with the structure of utilizing total reflection inside the light guide lens to emit light in a lateral direction with respect to the direction of incidence of the light from the light source, light loss increases since the light emitted from the end face of the light guide lens is unused.

As for the demand for vehicle-lamp designs using a solid-looking lens or crystalline-looking lens, prisms intended to emit light sideways by utilizing total reflection inside the light guide lens may be used. However, since these prisms look like a reflecting surface when observed from the light emission side, it is difficult for conventional light guide lenses to provide a crystalline look.

Furthermore, since such light guide lenses are intended for uniform light emission or so-called plane emission, it is difficult to provide a distinctive appearance in light emission.

SUMMARY

In view of the foregoing characteristics, technical features, and other problems and reasons, the presently disclosed subject matter includes a vehicle lamp which can suppress dimensions in the depth direction and provide a large emission area with a simple configuration.

Furthermore, the presently disclosed subject matter includes a vehicle lamp that can be configured to include a light-emitting surface having a wraparound configuration with an impressive appearance for excellent/different aesthetic qualities.

According to one aspect of the presently disclosed subject matter, a vehicle lamp can include a light source unit and a light guide lens. The light source unit can include at least one light source, and a converting part configured to convert light emitted from the light source to light having a predetermined narrow width. The conversion unit can include a pair of primary reflecting mirrors configured to reflect part of light emitted from the light source to respective predetermined directions with respect to a center section of an emission area of the light source about an optical axis thereof, the primary reflecting mirrors being arranged in the emission area excluding the center section. A pair of secondary reflecting mirrors can be configured to reflect light from the primary reflecting mirrors into a direction of light projection parallel to the optical axis, the secondary reflecting mirrors being arranged generally in parallel with the respective primary reflecting mirrors, on the respective predetermined direction sides from the primary reflecting mirrors with respect to the optical axis. The conversion part can have an emission area for emitting the converted light. The light guide lens can include: one end face having a shape corresponding to the shape of the emission area of the conversion part, serving as an incident surface; a thin plate-like light guiding portion configured to guide the incident light; and another end face being a farthest part of the light guiding portion away from the incident surface. The light guide lens can have a thin plate-like configuration. The light guide lens can guide the incident light from the incident surface toward the other end face and emit the guided light from a predetermined surface thereof on the way.

In the vehicle lamp described above, the thin plate-like light guiding portion may have a wide width side and a narrow width side, and the predetermined surface from which the guided light is emitted may be the wide width side. Alternatively, the predetermined surface from which the guided light is emitted may be the narrow width side.

In this vehicle lamp, the thin plate-like light guiding portion of the light guide lens can extend in a direction of emission of light from the light source and can be formed in a curved shape with respect to a direction orthogonal to the optical axis.

Furthermore, the thin plate-like light guiding portion of the light guide lens can have a plurality of thickness changing portions in a surface on a side different from the predetermined surface for emitting light. In this case, the thickness changing portions can be formed to increase in thickness gradually from the light source side so as to correspond to the curved shape.

Furthermore, the other end face and end faces located along edges of the predetermined surface for emitting light of the light guiding portion of the light guide lens excluding the incident surface can be tilted with respect to the predetermined surface at a predetermined angle. In one mode, the other end face and the end faces of the light guiding portion of the light guide lens may be tilted by approximately 45° with respect to the predetermined surface for emitting light.

According to the foregoing configurations, the light emitted from a part excluding the center section about the optical axis, out of the light emitted from each light source, is reflected by the primary reflecting mirrors of the conversion part in predetermined directions with respect to the center section. The secondary reflecting mirrors are located on the corresponding positions.

In this instance, the secondary reflecting mirrors reflect the light from the primary reflecting mirrors into the direction of light projection parallel to the optical axis. Then, this reflected light is emitted in the direction of light projection from an outlet of oblong shape that is not surrounded by the primary reflecting mirrors and the secondary reflecting mirrors.

The light from the secondary reflecting mirrors and the direct light emitted from the center section about the optical axis, out of the light emitted from each light source, are also emitted in the direction of light projection from the outlet of oblong shape that is not surrounded by the primary reflecting mirrors and the secondary reflecting mirrors.

The direct light and the reflected light emitted in the direction of light emission are incident on the light guide lens of thin plate-like configuration corresponding to the shape of the outlet. In this instance, the direct light and the reflected light travel inside the light guide portion of the light guide lens of thin plate-like configuration in the longitudinal direction with total reflection, and are emitted outside from the lateral surface.

Consequently, in the above described exemplary vehicle lamp, light having an oblong shape emitted by the primary reflecting mirrors and the secondary reflecting mirrors of the conversion part of the light source unit passes through the light guide lens of thin plate-like configuration and is emitted from the surface of this light guide lens. This vehicle lamp is thus not provided with a component that can be considered to be a reflecting surface located behind the light emitting surface as are ordinary lamps.

Thus, it is possible to provide a large emission area while suppressing the dimensions of the components other than the light-emitting parts in accordance with the present disclosure.

Moreover, in the presently disclosed subject matter, the light guide lens can extend in the direction of emission of light from the light source unit and can be shaped to curve with respect to a direction orthogonal to the optical axis, and in particular, in a horizontal direction. The light guide lens can also have a plurality of thickness changing portions along its shape.

In addition, the thickness changing portions can be formed to increase in thickness gradually from the light source side so as to correspond to the curved shape.

The light guide lens can be formed in a curved shape, which makes it possible for the light guide lens to emit light up to the end thereof even with a vehicle body that is formed with four corners that are cut away obliquely as described above.

The light traveling inside the light guide lens with total reflection can produce a prismatic effect at the thickness changing portions of the lens which have differences in lens thickness. Because of these thickness changing portions, the presently disclosed subject matter can include a lamp that can be configured to provide a solid-looking and crystalline-looking appearance when the lamp is turned off. When the lamp is turned on, the surface ends corresponding to the thickness changing portions can emit light to provide a block-like plurality of light emissions which effect has been previously unavailable in conventional lamps.

Moreover, the light guide lens can guide incident light to an area outside the vehicle through total reflection when its end faces excluding the incident surface opposed to the light source unit are tilted with respect to the outlet surface, by a tilt angle of approximately 45° (in a particular example). Consequently, the presently disclosed subject matter can reduce light loss at the end faces.

If the light guide lens guides the light emitted from the light source unit in its longitudinal direction and emits the light from the longitudinal surface of the light guide portion, and its end faces extending in the direction of light emission are oblique, have a curvature, and are composed of a step-like combination of flat surfaces for emitting the light from the light source unit to the front and in the direction of the optical axis and flat surfaces for causing total reflection inside the light guide lens and emitting the light sideways with respect to the optical axis, then it can be formed to have step-like prism cuts. As a result, the light is emitted outside through these prism cuts, so that the emission surface looks as if it is shining. In addition, when the lamp of the above described embodiment is turned off, incident light received from outside the vehicle is reflected by the prism cuts to provide a crystalline-looking appearance.

BRIEF DESCRIPTION OF THE DRAWINGS

These and other characteristics, features, and advantages of the presently disclosed subject matter will become clear from the following description with reference to the accompanying drawings, wherein.

DETAILED DESCRIPTION OF EXEMPLARY EMBODIMENTS

A description will now be given of exemplary embodiments of vehicle lamps made in accordance with principles of the presently disclosed subject matter with reference to FIGS. 1 to 12.

Note that in the following exemplary embodiments the vertical, horizontal, front-to-rear directions and the like are appropriately set on the basis of the respective drawings.

Figure 1:
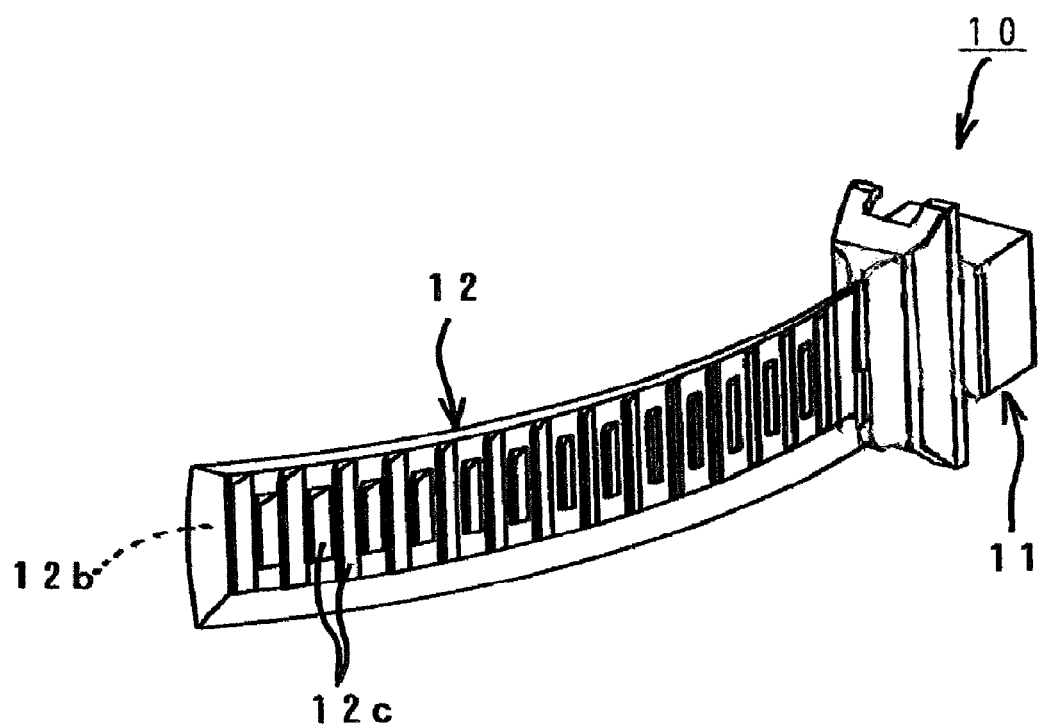
FIG. 1 is a schematic perspective view showing the configuration of a first exemplary embodiment of a vehicle lamp made in accordance with principles of the presently disclosed subject matter.
Figure 4:
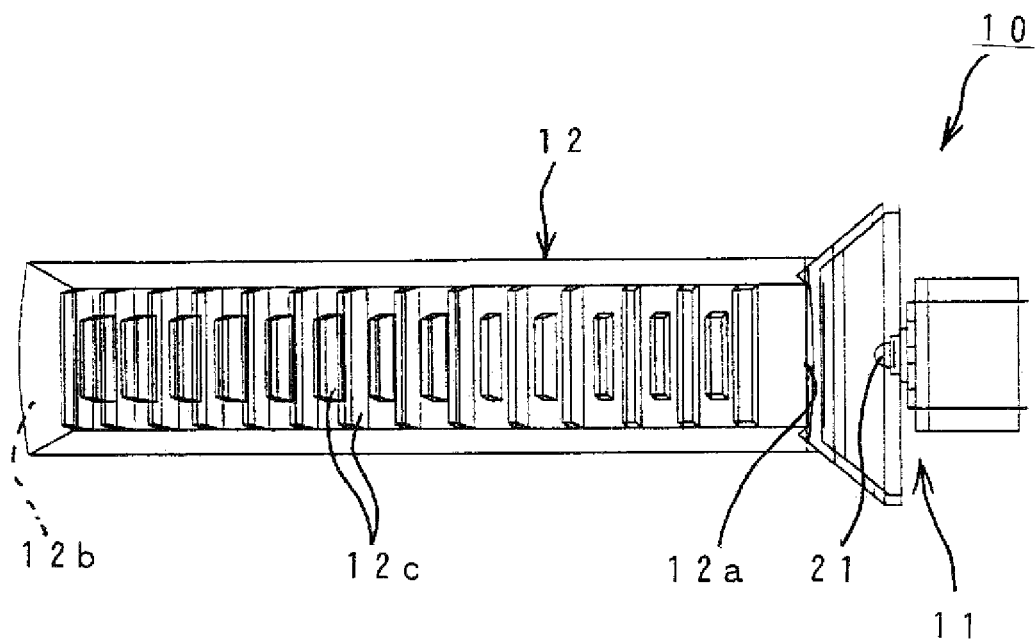
FIG. 4 is a schematic side view of the vehicle lamp of FIG. 1.

FIGS. 1 and 4 show the configuration of a first exemplary embodiment of a vehicle lamp made in accordance with principles of the presently disclosed subject matter.

In FIGS. 1 to 4, the vehicle lamp 10 is a signal lamp such as a vehicle position lamp, and can include a light source unit 11 and a light guide lens 12.

Figure 5:
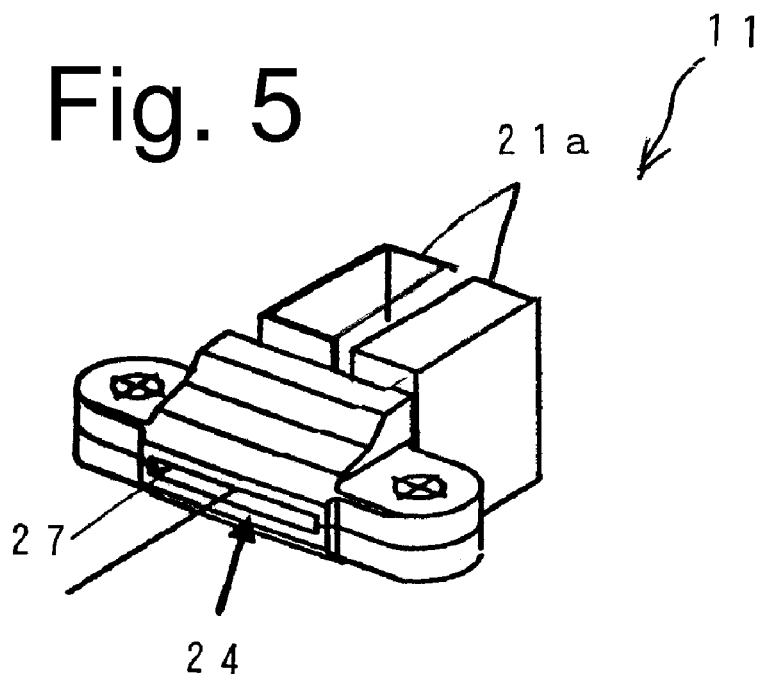
FIG. 5 is a schematic perspective view of the light source unit in the vehicle lamp of FIG. 1.
Figure 6:
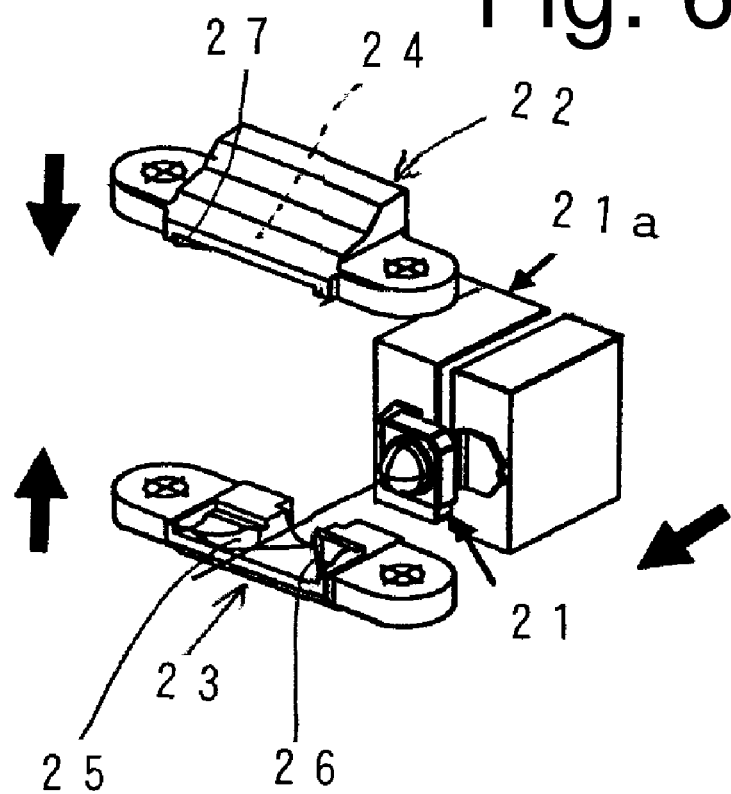
FIG. 6 is an exploded perspective view showing the configuration of the light source unit of FIG. 5.

As shown in FIGS. 5 and 6, the light source unit 11 can include at least one (one, in the shown example) LED light source 21 and a pair of fitting members 22 and 23 which constitute a conversion part.

The LED light source 21 can be a commercially available general-purpose LED light source. As shown in FIG. 6, the LED light source 21 is configured as a generally square package of so-called high output type, having a distribution control lens for giving directivity in front of the LED chip.

It should be appreciated that the LED light source 21 may be a typical LED light source of bullet type.

The LED light source 21 can be mounted on a metal circuit board 21a. Through this metal circuit board 21a, a drive voltage is applied as appropriate for lighting.

As shown in FIG. 6, the fitting members 22 and 23 of the conversion part may be formed in mutually identical shapes, and are provided with first and second reflecting mirrors 24 and 25, which serve as primary reflecting mirrors, and third and fourth reflecting mirrors 26 and 27, which serve as secondary reflecting mirrors, corresponding to the LED light source 21, respectively.

The fitting members 22 and 23 can each be made of a resin, composite, ceramic, or a metal such as die-cast metal material. The fitting members 22 and 23 and possibly circuit board can all be considered to be a housing having an elongate opening. Of course, the housing can be made from more or less parts and configured differently than is shown in the exemplary drawings or as described herein. The elongate nature of the opening shown in the figures is rectangular, for example, and has a longitudinal axis that extends in a direction parallel with the longest side of the rectangular opening.

The reflecting mirrors 24, 25, 26, and 27 are formed on respective inner surfaces of the fitting members 22 and 23. A thin-film surface treatment may be applied thereto through vapor deposition, sputtering, or the like of glossy metal such as aluminum and silver, thereby making reflecting surfaces.

Here, considering the direction of releasing the fitting members 22 and 23 during molding, the fitting member 22 can include the first reflecting mirror 24 and the fourth reflecting mirror 27. The fitting member 23 can include the third reflecting mirror 26 and the second reflecting mirror 25.

As shown by the arrows in FIG. 6, these fitting members 22 and 23 can be combined with each other and assembled by vibration welding or other welding, thermal caulking, screw cramping, bonding, adhesives, attachment structures such as screws, rivets, bolts, etc., or the like to complete the conversion part.

After this assembly, the metal circuit board 21a having the foregoing LED light source 21 mounted thereon is positioned at a predetermined location on the back of the fitting members 22 and 23, and fixed and held by screw cramping, thermal caulking, vibration welding, adhesives, attachment structures such as screws, rivets, bolts, etc., or the like.

As a result, the respective fitting members 22 and 23, when combined with each other, can define an opening on the optical axis of the LED light source 21 formed as a light outlet 28 having a horizontally-long slit shape. The fitting members 22 and 23 can thus have mutually identical shapes, being horizontally divided into equal halves from the foregoing assembled state.

Next, the individual reflecting mirrors 24 to 27 will be described in detail with reference to FIG. 7.

Initially, the first reflecting mirror 24 can be made of a plane mirror (or a convex or concave mirror having a large curvature), for example. Its reflecting surface is opposed to the light-emitting surface of the corresponding LED light source 21.

The first reflecting mirror 24 is arranged in an emission area in front of the LED light source 21 in the direction of the optical axis (the direction of the arrow A) excluding the center section about the optical axis. Specifically, the first reflecting mirror 24 is arranged obliquely toward the front from one side, or the left in FIG. 7, to the right side at an angle of approximately 45°, for example, and slightly downward at 1° to 30°, for example. At the same time, the first reflecting mirror 24 is arranged across an area wider than the width of the LED light source 21 so as to correspond to a top section of one third the vertical height/width when the light-emitting surface of the LED light source 21 is vertically divided into three.

The first reflecting mirror 24 is thus configured to reflect part of the light emitted from the LED light source 21 to one direction (in the shown example, to the right side) with respect to the foregoing center section.

The third reflecting mirror 26 can be made of a plane mirror (or a convex or concave mirror having a large curvature), for example. Its reflecting surface is directed in the direction of light projection, and opposed to the reflecting surface of the first reflecting mirror 24.

The third reflecting mirror 26 is arranged generally in parallel with the first reflecting mirror 24, on one side from the first reflecting mirror with respect to the optical axis. Specifically, the third reflecting mirror 26 is arranged in front of the corresponding LED light source 21 in parallel with this first reflecting mirror 24, i.e., obliquely toward the front from one side (the left in FIG. 7) to the other side (right side) at an angle of approximately 45°, for example, like the first reflecting mirror 24 and slightly upward at 1° to 30°, for example, so as to correspond to the center section of one third the vertical height/width when the light-emitting surface of the LED light source 21 is vertically divided into three.

The third reflecting mirror 26 is thus configured to reflect the light from the first reflecting mirror 24 forward in the direction of light projection and at least substantially parallel to the optical axis.

In the meantime, the second reflecting mirror 25 and the fourth reflecting mirror 27 are formed in a configuration and arrangement rotationally symmetrical to the first reflecting mirror 24 and the third reflecting mirror 26 as described above with respect to the optical axis of the LED light source 21, i.e., as rotated 180° about the optical axis.

Figure 8:
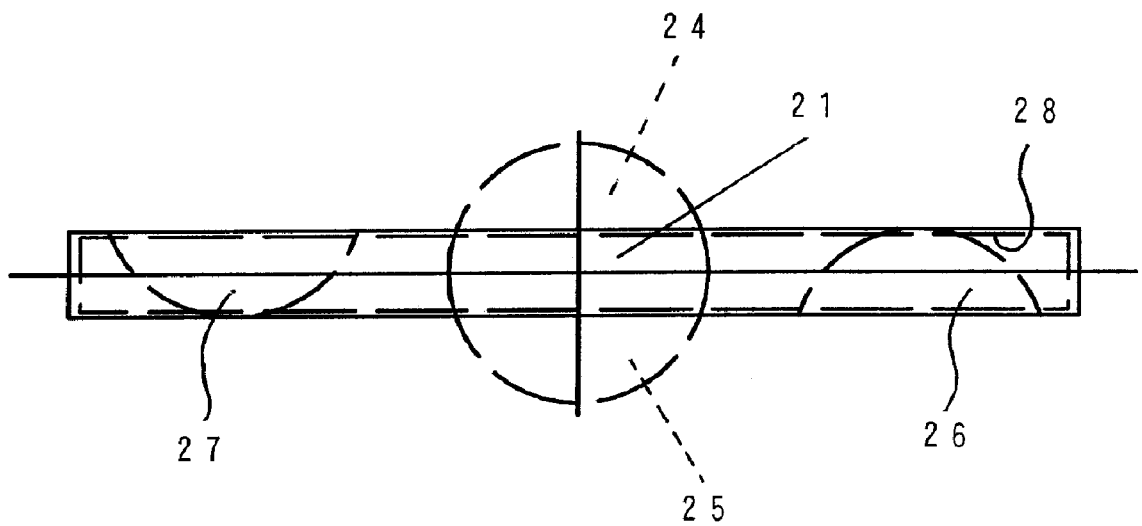
FIG. 8 is a partially enlarged front view of a light outlet pertaining to each individual LED light source in the vehicle lamp of FIG. 1.
Figure 9:
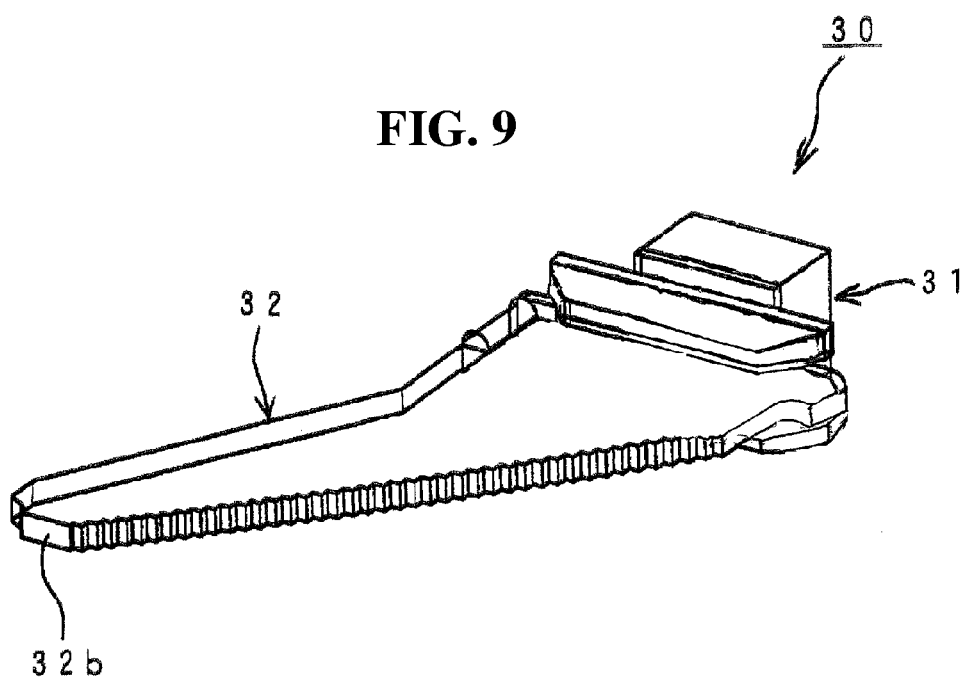
FIG. 9 is a schematic perspective view showing the configuration of a second exemplary embodiment of a vehicle lamp made in accordance with principles of the presently disclosed subject matter.

Consequently, when one light outlet 28 is viewed from the front, as shown in FIG. 8, the third reflecting mirror 26 and the fourth reflecting mirror 27 fall on both sides of the LED light source 21 in the horizontally-long light outlet 28, respectively, thereby functioning as respective light-emitting parts.

It should be noted that, although the light outlet 28 of the light source unit 11 is arranged so as to extend horizontally in FIGS. 5 to 8, in the vehicle lamp 10 of FIGS. 1 to 4, the light outlet 28 is arranged to extend vertically.

Next, the light guide lens 12 will be described. The light guide lens 12 can be made of a translucent material in the form of a thin plate. One end 12a of thin plate shape can be opposed to the vertically-arranged light outlet 28 of the light source unit 11 so as to match it along its lengthwise direction.

Here, the one end 12a of the light guide lens 12 is designed to be greater in height and thickness than the light outlet 28 of the light source unit 11, such as 12 mm or more in the vertical dimension (height) and 4 mm or more in the horizontal dimension (thickness). The light guide lens 12 has a longitudinal axis that runs along the longest portion of the lens and is bounded by the outer peripheral extent of the lens. For example, the light guide lens 12 shown in FIG. 1 has a longitudinal axis that extends in curved fashion from the incident surface at the one end 12a to the other end 12b.

The light guide lens 12 can also be formed so that its end faces (except for the one end 12a—the incident surface), namely, the other end 12b and the top and bottom ends (corresponding to the other end faces) in the drawing are cut away obliquely 45° into slopes at the curved inside, thereby forming a trapezoidal section on the whole.

Furthermore, the light guide lens 12 can be shaped to curve to one side (the left in FIG. 2) along the longitudinal direction from the one end 12a to the other end 12b.

As a result, light incident on the one end 12a of the light guide lens 12 repeats total reflection on the sides of the light guide lens 12 while traveling toward the other end 12b.

The light guide lens 12 has, in it's curved inside surface, a plurality of recesses 12c which are arranged in line in the longitudinal direction. In the shown example, the recesses 12c each can have a depth of 1 mm or more.

Figure 2:
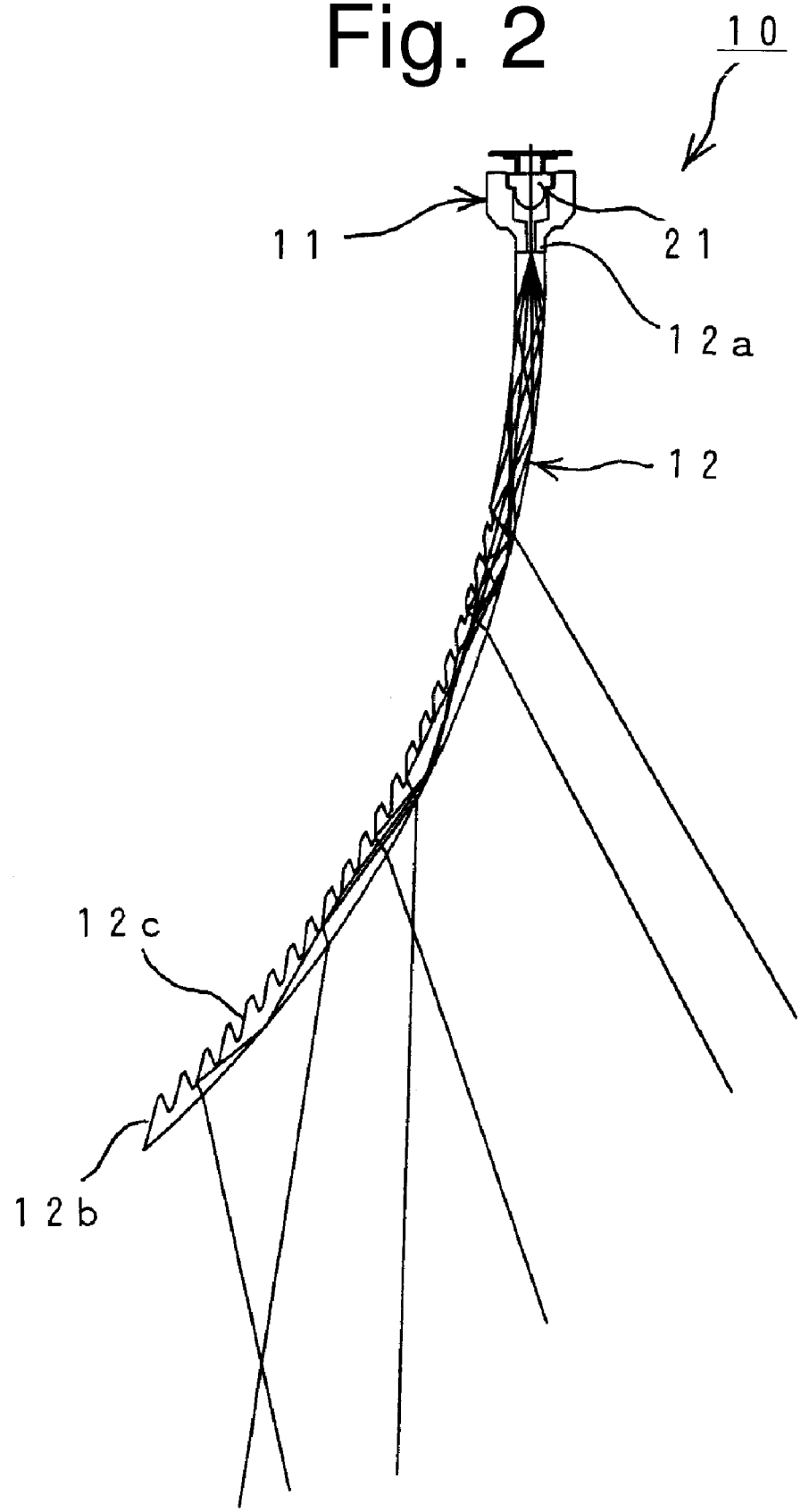
FIG. 2 is a schematic plan view of the vehicle lamp of FIG. 1.
Figure 3:
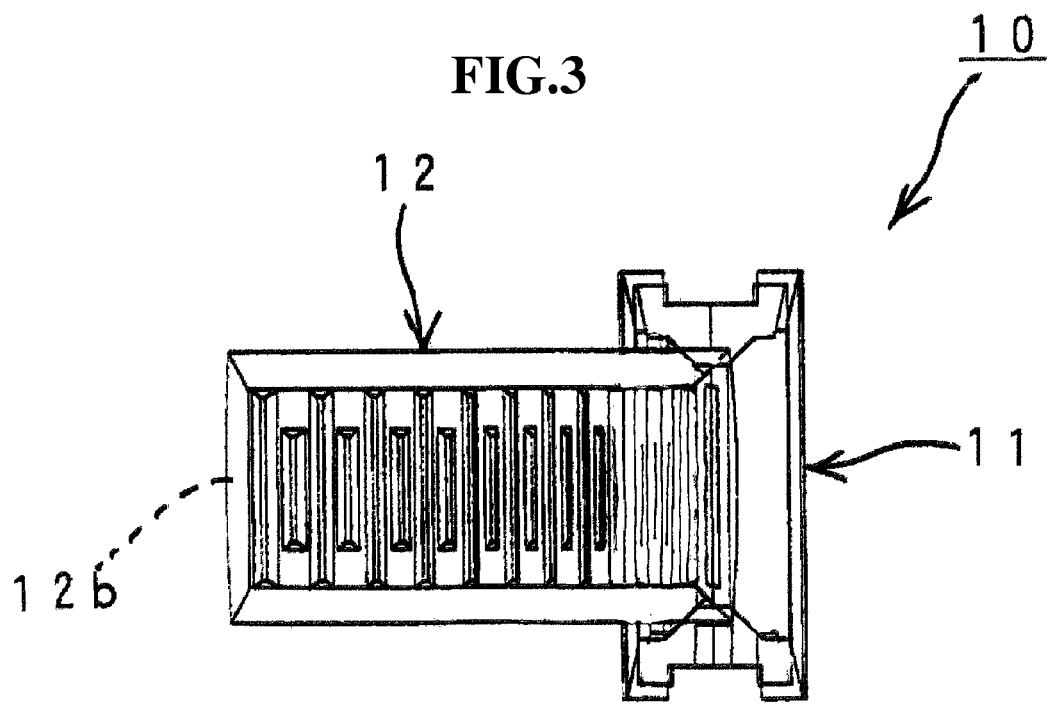
FIG. 3 is a schematic front view of the vehicle lamp of FIG. 1.

As shown in FIG. 2, these recesses 12c are made of generally perpendicular surfaces of minimum draft angles for facilitating molding. As will be detailed in FIG. 4, vertically long recesses and short recesses can be formed alternately along the length of the lens 12.

The recesses 12c are thereby formed to increase in depth gradually toward the other end 12b, giving some accent to the design and appearance of the light guide lens 12.

The light guide lens 12 can also be formed so that the curved outside surface has a curvature in the vertical direction (widthwise curvature). This gives the light guide lens 12 a solid looking appearance.

The vehicle lamp 10 according to the first exemplary embodiment of the presently disclosed subject matter can be configured as described above. Hereinafter, a description will be given of the state of light emission from the light source unit and the light guiding state of light by means of the light guide lens 12. FIGS. 5 to 8 are referred to with regard to the light source unit 11 while FIGS. 1 to 4 are referred to with regard to the light guide lens 12. The directions are determined on the basis of the state shown in each drawing.

Figure 7:
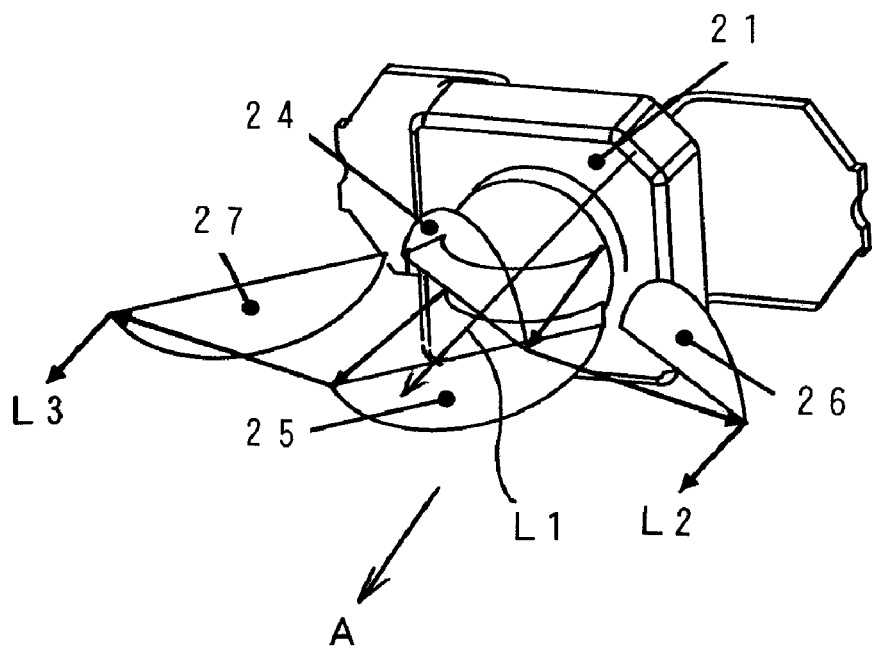
FIG. 7 is a schematic perspective view showing the state of light reflection by reflecting mirrors in the light source unit of FIG. 5.

Of the light emitted from the LED light source 21 of the light source unit 11, light L1 that is emitted from the center section located within approximately one third the vertical width and at the center (emission center) of the light source, when the light-emitting surface is vertically divided into three, is simply projected forward (see FIG. 7).

Meanwhile, light L2 that is emitted from the top section of the light-emitting surface having approximately one third the vertical width, out of the light emitted from the LED light source 21, is incident on the first reflecting mirror 24, is reflected to one side (right side in the shown example) slightly downward, and travels toward the third reflecting mirror 26.

The light L2 incident on the third reflecting mirror 26 is generally horizontally reflected toward the front by this third reflecting mirror 26 for forward projection.

Furthermore, light L3 emitted from the bottom section of the light-emitting surface having approximately one third the vertical width is incident on the second reflecting mirror 25, is reflected to the other side (left side in the shown example) slightly downward, and travels toward the fourth reflecting mirror 27.

The light L3 incident on the fourth reflecting mirror 27 is generally horizontally reflected toward the front by this fourth reflecting mirror 27 for forward projection.

Here, the light from the top one-third section of the light-emitting surface of the LED light source 21 is reflected twice by the first reflecting mirror 24 and the third reflecting mirror 26, and is thus projected forward as shifted to one side (right side in the shown example) and in the center area at a location corresponding with the center one-third height of the light-emitting surface of the LED light source 21.

The light from the bottom one-third area of the light-emitting surface of the LED light source 21 is reflected twice by the second reflecting mirror 25 and the fourth reflecting mirror 27, and is thus projected forward as shifted to the other side (left side in the shown example) in the center area at a location corresponding with the center one-third height of the light-emitting surface of the LED light source 21.

Consequently, as shown in FIG. 8, the light emitted from each area of the LED light source 21 falls at a location corresponding with the center one-third area of the light-emitting surface of the LED light source 21. Namely, the vertical width of the light-emitting surface corresponds to approximately one third the vertical width of the light-emitting surface of the LED light source 21, thereby providing a light-emitting surface of so-called narrow width.

For example, when using a φ4.5-mm general-purpose LED light source as the LED light source 21, the light outlet may have a vertical width of 1.5 mm and a horizontal width of approximately 13.5 mm (when referring to the horizontally extending light configuration as shown in FIG. 8).

When the light source unit 11 as described above is installed in a vehicle light, it can also be arranged vertically. Then, the vertically-long narrow light emitted from the light source unit 11 is incident on the one end 12a of the light guide lens 12 and is guided toward the other end 12b with total reflection at both side surfaces of the light guide lens 12.

In this process, light that enters the interiors of the recesses 12c on its way through the guide lens 12 can be totally reflected by the perpendicular surfaces of the recesses 12c and emitted sideways from the curved outside surface of the light guide lens 12.

Here, the respective recesses 12c are formed to increase in depth gradually toward the other end 12b, so that the light beams emitted outside from the respective recesses 12c have generally uniform intensities.

Light that is not incident on the recesses 12c as it travels through the guide lens 12 can be totally reflected by the tilted other end 12b of the light guide lens 12 and similarly emitted toward the front from the curved outside surface of the light guide lens 12.

Furthermore, light that is incident on the top and bottom ends of the light guide lens 12 on its way through the lens can be totally reflected by these tilted top and bottom ends and emitted sideways.

In this way, according to the vehicle lamp 10 of this exemplary embodiment of the presently disclosed subject matter, the vertically-long and narrow light emitted from the light source unit 11 is guided to curve with respect to the direction of light emission along the light guide lens 12, so that a part of it is totally reflected by the recesses 12c and the top and bottom ends and emitted sideways while the other part is totally reflected by the other end 12b and emitted toward the front, as shown for example in FIG. 2.

Consequently, when the light guide lens 12 described above is arranged to wrap around the fender area of a vehicle body, it is possible to make the entire curved outside surface of the light guide lens 12 emit light by using the light source unit 11 which is located behind the one end 12a of the light guide lens 12.

Here, since the light guide lens 12 has the low-profile configuration (thin plate-like shape), it can be arranged along near the surface of the fender area of the vehicle body. Furthermore, the light source unit 11 has the vertically-long light-emitting surface of narrow width, and thus requires an extremely small installation space inside the fender area of the vehicle body. This can suppress interference with other structures, such as a headlamp, damper, electronic components, etc., effectively, and increases layout and design flexibilities.

Moreover, since the light guide lens 12 leaves space inside its curved portion, it is possible to install other lamps and the like in this inside space.

In this case, light emitted from the other lamps can also be passed through the light guide lens 12 and projected forward in the direction of light projection. This makes it possible to configure a small-sized lamp of innovative design.

FIGS. 9 through 12 show the configuration of a second exemplary embodiment of a vehicle lamp made in accordance with principles of to the presently disclosed subject matter. The vehicle lamp 30 can include a light source unit 31 and a light guide lens 32.

Here, the light source unit 31 can have the same configuration as that of the light source unit 11 in the vehicle lamp 10 shown in FIGS. 5 to 8, with the only difference in that the light outlet 28 is situated such that it extends horizontally.

The light guide lens 32 can be thin in a vertical direction and made of a translucent material. One end 32a of the lens 32 is arranged to be opposed to the horizontally-arranged light outlet (not shown) of the light source unit 31.

Here, the one end 32a of the light guide lens 32 may be designed to be greater in at least one of vertical thickness and horizontal width than the vertical thickness and horizontal width of the light outlet 28 of the light source unit 31, such as 4 mm or more in the vertical dimension (thickness).

Figure 10:
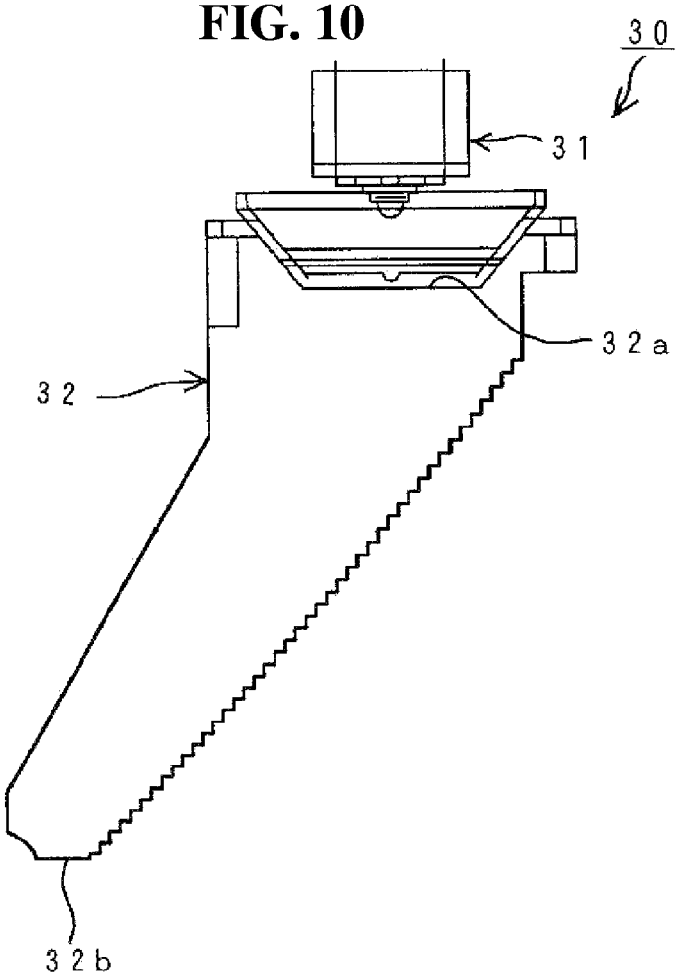
FIG. 10 is a schematic plan view of the vehicle lamp of FIG. 9.
Figure 11:
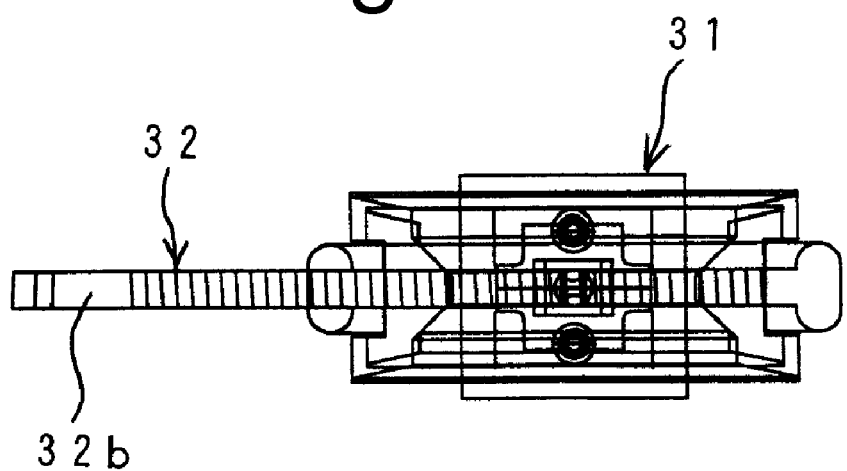
FIG. 11 is a schematic front view of the vehicle lamp of FIG. 9.
Figure 12:
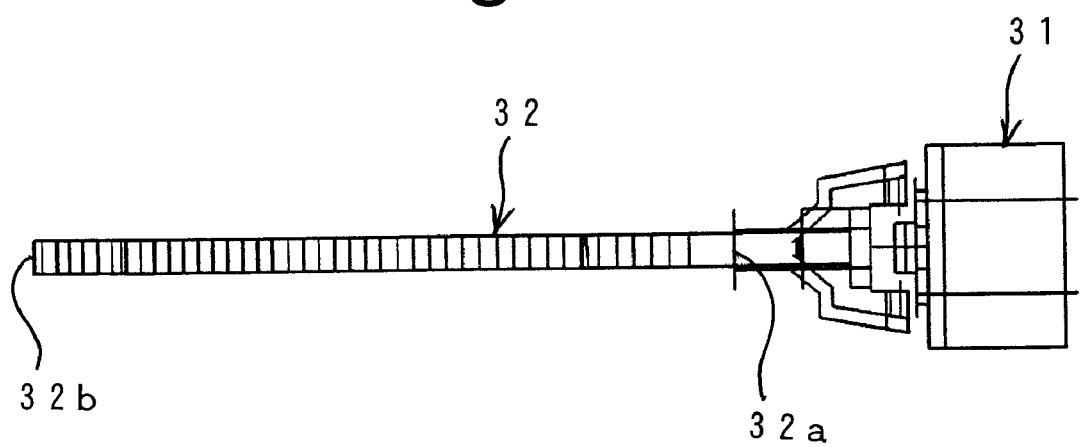
FIG. 12 is a schematic side view of the vehicle lamp of FIG. 9.

The light guide lens 32 can also be shaped to curve generally to one side (the left in FIG. 10) along the longitudinal direction from the one end 32a to the other end 32b. More specifically, as shown in FIG. 10, the outside surface can be formed as a prism cut area of step-like configuration at intervals of 3 mm or less, i.e., by combining flat surfaces substantially perpendicular to the optical axis of the light source unit 31 and flat surfaces substantially parallel to the optical axis.

Meanwhile, the curved inner end of the light guide lens 32 can be formed to extend obliquely with respect to the optical axis so that it totally reflects light from the light source unit 31.

According to the vehicle lamp 30 of such configuration, the horizontally-long narrow light emitted from the light source unit 31 enters the light guide lens 32 from the one end 32a and is guided toward the other end 32b with total reflection at both side surfaces of the light guide lens 32.

In this process, light that is incident on the step-like outside surface as it travels through the guide lens 32 is transmitted through the flat surfaces of this step-like prism cut area, perpendicular to the optical axis, and projected toward the front. Light that is incident on the surfaces parallel to the optical axis is totally reflected.

Moreover, light that is incident on the inside surface during its travel through the guide lens 32 is totally reflected by this obliquely-extending inside surface, impinges on the step-like prism cut area of the outer side at large angles with respect to the optical axis, and is emitted sideways.

As a result, the outside surface having the prism cut area emits light.

When the lamp is off on the other hand, light that enters the interior of the light guide lens 32 from outside is reflected by flat shape portions of the light guide lens 32 and via the prism cut area that has a step-like shape and is emitted outside again, thereby providing a crystalline-looking appearance.

In the vehicle lamps 10 and 30 according to the foregoing exemplary embodiments, the light source units 11 and 31 each have a single LED light source 21. This is not restrictive, however, and a plurality of LED light sources 21 may be arranged in line along the longitudinal direction, i.e., vertically or horizontally (or possibly both). A plurality of light guide lenses 12 and 32 may be arranged accordingly in line corresponding to the respective LED light sources 21.

Moreover, in the vehicle lamps 10 and 30 according to the foregoing exemplary embodiments, the light source units 11 and 31 are arranged with their light outlet either extending vertically or horizontally. This is not restrictive, however, and they may obviously be arranged so that the light outlet extends obliquely.

The oblique arrangement of the light source configuration having narrow width can thus provide even more innovative design possibilities.

Furthermore, in the vehicle lamps 10 and 30 according to the foregoing exemplary embodiments, the LED light source 21 is used as the light source. This is not restrictive, however, and it is understood that other types of light-emitting devices and other types of lamps may also be used as the light source, such as halogen, high intensity discharge, incandescent, fluorescent, laser and other types of light sources.

The presently disclosed subject matter has dealt with the exemplary embodiments simply applied to a vehicle lamp such as a position lamp. This is not restrictive, however, and it may be applied to various signal lamps and other vehicle lamps, including tail lamps, stop lamps, center high-mount stop lamps, backup lamps, front turn lamps, rear turn lamps, side marker lamps, traffic lamps, decorative lamps, headlamps, etc.

As above, according to the presently disclosed subject matter, it is possible to provide a truly excellent vehicle lamp which is configured so that it can suppress dimensions in the depth direction and provide a wide light-emitting area with a simple configuration, and has a light-emitting surface of wraparound configuration with impressive appearance for excellent aesthetic qualities and design possibilities.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. All related/conventional art references described above are hereby incorporated in their entirety by reference.

What is claimed is:

1. A vehicle lamp, comprising:
   a light source unit including,
     at least one light source having an emission area and configured to emit light along an optical axis and in a light emitting direction, and
   a converting part including:
     a pair of primary reflecting mirrors configured to reflect part of the light emitted from the light source to respective predetermined directions with respect to a center section of the emission area of the light source and about the optical axis, the primary reflecting mirrors being arranged in the emission area but spaced from the center section when viewed from the light emitting direction; and
     a pair of secondary reflecting mirrors configured to reflect light from the primary reflecting mirrors into a direction substantially parallel to the optical axis, each of the secondary reflecting mirrors being arranged substantially parallel with a respective one of the primary reflecting mirrors, the converting part thus being configured to convert light emitted from the light source to converted light having a predetermined narrow width, the conversion part having an emission area configured to emit the converted light; and a light guide lens including, one end face having a shape corresponding to the emission area of the converting part, and including an incident surface which is configured to receive the converted light and to allow the converted light to pass through to become incident light, a thin plate-like light guiding portion configured to guide the incident light, and an other end face being a farthest part of the light guide lens away from the incident surface, the light guide lens configured to guide the incident light from the incident surface toward the other end face and configured to emit a first portion of the incident light from the other end face and configured to emit a second different portion of the incident light from a predetermined surface of the light guide lens separate from and located between the incident surface and other end face of the light guide lens.

2. The vehicle lamp according to claim 1, wherein the thin plate-like light guiding portion has a wide width side and a narrow width side, the predetermined surface from which the guided light is emitted being the wide width side.

3. The vehicle lamp according to claim 2, wherein the thin plate-like light guiding portion of the light guide lens extends in a direction of emission of light from the light source and is formed in a curved shape with respect to a direction orthogonal to the optical axis.

4. The vehicle lamp according to claim 3, wherein the thin plate-like light guiding portion of the light guide lens has a plurality of thickness changing portions in a surface on a side different from the predetermined surface for emitting light; and the thickness changing portions increase in thickness gradually from a side closest to the light source towards the other end face so as to correspond to the curved shape.

5. The vehicle lamp according to claim 4, wherein the other end face and end faces located along edges of the predetermined surface of the light guiding portion of the light guide lens excluding the incident surface extend at a predetermined angle greater than zero with respect to the predetermined surface.

6. The vehicle lamp according to claim 5, wherein the other end face and the end faces of the light guiding portion of the light guide lens are tilted at approximately 45° with respect to the predetermined surface.

7. The vehicle lamp according to claim 1, wherein the thin plate-like light guiding portion has a wide width side and a narrow width side, the predetermined surface from which the guided light is emitted being the narrow width side.

8. The vehicle lamp according to claim 7, wherein the thin plate-like light guiding portion of the light guide lens extends in a direction of emission of light from the light source and is formed in a curved shape with respect to a direction orthogonal to the optical axis.

9. The vehicle lamp according to claim 8, wherein the thin plate-like light guiding portion of the light guide lens has a plurality of thickness changing portions in a surface on a side different from the predetermined surface for emitting light; and the thickness changing portions increase in thickness gradually from a side closest to the light source towards the other end face so as to correspond to the curved shape.

10. The vehicle lamp according to claim 9, wherein the other end face and end faces located along edges of the predetermined surface of the light guiding portion of the light guide lens excluding the incident surface extend at a predetermined angle greater than zero with respect to the predetermined surface.

11. The vehicle lamp according to claim 10, wherein the other end face and the end faces of the light guiding portion of the light guide lens are tilted at approximately 45° with respect to the predetermined surface.

12. The vehicle lamp according to claim 1, wherein the thin plate-like light guiding portion of the light guide lens extends in a direction of emission of light from the light source and is formed in a curved shape with respect to a direction orthogonal to the optical axis.

13. The vehicle lamp according to claim 12, wherein the thin plate-like light guiding portion of the light guide lens has a plurality of thickness changing portions in a surface on a side different from the predetermined surface for emitting light; and the thickness changing portions increase in thickness gradually from a side closest to the light source towards the other end face so as to correspond to the curved shape.

14. The vehicle lamp according to claim 13, wherein the other end face and end faces located along edges of the predetermined surface for emitting light of the light guiding portion of the light guide lens excluding the incident surface extend at a predetermined angle greater than zero with respect to the predetermined surface.

15. The vehicle lamp according to claim 14, wherein the other end face and the end faces of the light guiding portion of the light guide lens are tilted at approximately 45° with respect to the predetermined surface.

16. The vehicle lamp according to claim 1, wherein the light source includes at least one LED lamp.

* * * * *